United States Patent Office 2,728,782
Patented Dec. 27, 1955

2,728,782

HYDROLYSIS OF STEROID KETALS

Barney J. Magerlein and Robert H. Levin, Kalamazoo, Mich., assignors to The Upjohn Company, Kalamazoo, Mich., a corporation of Michigan No Drawing. Application December 17, 1951,
Serial No. 262,182

11 Claims. (Cl. 260—397.45)

This invention relates to the hydrolysis of certain steroid diketals and is more particularly concerned with a novel process for the hydrolysis of novel 11β-hydroxypregnane-3,20-dione-3,20-diketals to produce 11β-hydroxypregnane-3,20-dione.

The novel starting compounds of the present invention are 11β-hydroxypregnane-3,20-dione-3,20-diketals, which may be represented by the following formula:

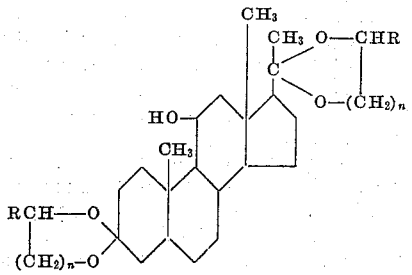

wherein R is selected from the group consisting of hydrogen and alkyl groups containing from one to six carbon atoms, inclusive, such as, for example, methyl, ethyl, propyl, isopropyl, butyl, amyl, isoamyl, hexyl, and the like, and "n" represents the integers one or two.

According to the method of the present invention, an 11β - hydroxypregnane - 3,20 - dione - 3,20 - alkanediol diketal of the above formula is hydrolyzed by a process which includes mixing a hydrolyzing agent, in excess of the amount theoretically required, and the steroid diketal in a solvent which is non-reactive with the reactants or reaction products under the conditions of reaction at a temperature between about zero degrees centigrade and the boiling point of the reaction mixture to produce 11β-hydroxypregnane-3,20-dione.

An object of the present invention is to provide a novel process for the hydrolysis of novel 11β-hydroxypregnane-3,20-dione-3,20-diketals. Another object is to provide a novel process for the production of 11β-hydroxypregnane-3,20-dione. Other objects of the present invention will be apparent to those skilled in the art to which this invention pertains.

It is well known in the art that the 11-hydroxy substituent of many of the naturally-occurring physiologically active cortical steroids is of the beta-configuration. The known compound produced by the novel process of the present invention has this 11β-hydroxy configuration and consequently is of great interest in the field of cortical hormone research and is useful as an intermediate in the synthesis of certain physiologically-active steroids containing an 11β-hydroxy group, such as present in cortical hormones such as Kendall's Compound F and corticosterone, as shown by Von Euw, Lardon and Reichstein, Helv. Chim. Acta, 27, 821 and 1287 (1944). The importance of this novel process is moreover emphasized by the acute shortage of adrenal cortical hormones and by the absence of any present suggestion for the alleviation of the said shortage except through organic synthesis.

The starting steroid materials are prepared by a process which includes mixing, in an excess of that amount theoretically required, a reducing agent such as, for example, lithium aluminum hydride and an organic solvent which is non-reactive with the reactants and reaction products under the conditions of reaction and a pregnane-3,11,20-trione-3,20-alkanediol diketal, wherein the ketal group is the residue of a compound selected from the group consisting of alkane-1,2-diols and alkane-1,3-diols, containing from two to eight carbon atoms, inclusive, to produce an 11β-hydropregnane-3,20-dione-3,20-diketal. The starting diketal compounds are in turn prepared by a process which includes mixing an organic ketal forming agent selected from the group consisting of alkane-1,2-diols and alkane-1,3-diols, in excess of the amount theoretically required, and pregnane-3,11,20-trione in an organic solvent, which is non-reactive under the conditions of reaction, in the presence of a catalyst such as an organic sulfonic acid or mineral acid, and separating the thus-produced pregnane-3,11,20-trione-3,20-diketal. The pregnane-3,11,20-trione itself is a compound known in the prior art and is prepared according to the procedure of Reichstein and Fuchs, Helv. Chim. Acta, 26, 721 (1943). The preparation of the starting diketal compounds employed in the process of the present invention will be illustrated in greater detail in the preparations following in this specification.

Starting steroid diketals which are operative in the method of the present invention include 11β-hydroxypregnane-3,20-dione-3,20-ethylene glycol diketal, 11β-hydroxypregnane-3,20-dione-3,20-propylene glycol diketal, 11β - hydroxypregnane - 3,20 - dione - 3,20 - butylene glycol diketal, 11β-hydroxypregnane-3,20-dione-3,20-amylene glycol diketal, 11β-hydroxypregnane-3,20-dione-3,20-hexylene glycol diketal, 11β-hydroxypregnane-3,20-dione-3,20-heptylene glycol diketal, 11β-hydroxypregnane-3,20-dione-3,20-octylene glycol diketal, the corresponding 1,3-diol diketals such as, for example, 11β-hydroxypregnane - 3,20 - dione - 3,20 - propane - 1',3' - diol diketal, 11β - hydroxypregnane - 3,20 - dione - 3,20-butane-1',3'-diol diketal, and others.

In carrying out the process of the present invention, a starting 11β-hydroxypregnane-3,20-dione-3,20-diketal is usually dissolved in a solvent which is non-reactive under the conditions of reaction and the solution then admixed with a hydrolyzing agent. Aqueous acid hydrolyzing agents are generally employed, such as, for example, dilute mineral acids, certain organic acids, such as para-toluenesulfonic acid in the presence of water, phosphoric acids and others, dilute mineral acids such as hydrochloric and sulfuric being preferred. Of the mineral acids, dilute hydrochloric acid is the preferred acid hydrolyzing agent. Certain organic acids and other acidic agents are sometimes employed. The order of addition of the reactants is not critical. Frequently it is desirable, as illustrated in Example 1, to utilize the hydrogenated reaction mixture from the prior step involving lithium aluminum hydride hydrogenation of a pregnane-3,11,20-trione-3,20-diketal without first isolating the 11β-hydroxypregnane-3,20-dione-3,20-diketal reaction product. In such case, the starting hydrolysis reaction mixture may also contain substantial quantities of unreacted lithium aluminum hydride and a mixture of solvents such as ether, benzene and the like. Example 2 illustrates the hydrolysis procedure wherein the starting 11β-hydroxypregnane-3,20-dione-3,20-diketal formed in the prior hydrogenation step is isolated prior to hydrolysis.

The hydrolyzing agent is usually employed in amounts greater than that theoretically required to hydrolyze completely the starting steroid, weight ratios of such hydrolyzing agent to steroid of about two to one being operative, although in practice weight ratios of five to one and above are generally used. The reaction may be conducted at a temperature between about zero degrees centigrade and the boiling point of the reaction mixture, about room temperature being preferred. Occasionally, however, it is desirable to heat the reaction components to the boiling point of the reaction mixture to ensure complete hydrolysis of the 3-ketal and 20-ketal groups in the steroid nucleus. In general, the reaction mixture is permitted to stand for between about one and 24 hours, the exact period depending upon the ratio of starting materials employed and the temperature at which the hydrolysis reaction is conducted.

When hydrolysis of the starting material is substantially complete, the organic solvent or mixture of solvents is removed by conventional procedure, preferably by washing and drying the organic fraction followed by concentration of the solvent. The pure 11β-hydroxypregnane-3,20-dione is then obtained by crystallization from an organic solvent or a mixture of solvents. An ethyl acetate-hexane hydrocarbon mixture of solvents is the preferred crystallization solvent medium. Alternatively, purification is achieved by removal of the organic solvent, leaving a residue from which the 11β-hydroxypregnane-3,20-dione can be separated by procedures known to the art.

When the novel process of the present invention is carried out in the above-described manner, yields of fifty per cent of the theoretical or more of 11β-hydroxypregnane-3,20-dione, based on the pregnane-3,11,20-trione-3,20-diketal employed in the prior hydrogenation step, are obtained when the 11β-hydroxypregnane-3,20-dione-3,20-diketal is not isolated in the hydrogenation step. When the 11β-hydroxypregnane-3,20-dione-3,20-diketal is first isolated from the prior hydrogenation step, as illustrated in Example 2, an almost quantitative yield, based on the direct hydrolysis of 11β-hydroxypregnane-3,20-dione-3,20-diketal is usually achieved.

The following examples are illustrative of the process and products of the present invention but are not to be construed as limiting.

PREPARATION 1.—11β-HYDROXYPREGNANE-3,20-DIONE-3,20-ETHYLENE GLYCOL DIKETAL (A) A mixture of 500 milligrams (1.5 millimoles) of pregnane-3,11,20-trione, five milliliters (90.0 millimoles) of ethylene glycol, twenty milligrams of para-toluenesulfonic acid and 150 milliliters of benzene was refluxed with stirring for sixteen hours. The water of reaction formed was continuously removed by co-distillation with the refluxing benzene. When approximately the theoretical amount of water had been removed, the benzene solution was washed with successive portions of a dilute sodium bicarbonate (NaHCO₃) solution and water, respectively, and then dried. The residue remaining after evaporation of the benzene was crystallized from propanol-2 to give 430 milligrams (1.0 millimole), a 67 per cent yield, of crude product melting at 139–142 degrees centigrade. Recrystallization from propanol-2 raised the melting point of the pregnane-3,11,20-trione-3,20-ethylene glycol diketal to 142–144 degrees centigrade. The theoretical structure was confirmed by infra-red analysis.

(B) To an admixture of 300 milligrams (7.9 millimoles) of lithium aluminum hydride and thirty milliliters of ether was added 300 milligrams (0.71 millimole) of pregnane-3,11,20-trione-3,20-ethylene glycol diketal from (A) partially dissolved in ten milliliters of benzene. This solution was stirred for one hour at room temperature after which time it was refluxed for one hour and then hydrolyzed with ice. The precipitate and water were extracted repeatedly with ether and the combined ether extracts were evaporated after washing and drying. Recrystallization from ethyl acetate-hexane hydrocarbon (Skelly Solve B) solvent gave a yield of 238 milligrams (79 per cent) of 11β-hydroxypregnane-3,20-dione-3,20-ethylene glycol diketal. The structure was confirmed by infra-red analysis.

PREPARATION 2.—11β-HYDROXYPREGNANE-3,20-DIONE-3,20-PROPYLENE GLYCOL DIKETAL (A) In the manner of Preparation 1(A), an admixture of pregnane-3,11,20-trione, propylene glycol, benzene and para-toluenesulfonic acid is refluxed under the conditions of Preparation 1(A). Upon separation the pregnane-3,-11,20-trione-3,20-propylene glycol diketal is obtained.

(B) In the manner of Preparation 1(B), 11β-hydroxypregnane-3,20-dione-3,20-propylene glycol diketal is prepared using pregnane-3,11,20-trione-3,20-propylene glycol diketal from Preparation 2(A) instead of pregnane-3,11,20-trione-3,20-ethylene glycol diketal.

PREPARATION 3.—11β-HYDROXYPREGNANE-3,20-DIONE-3,20-PROPANE-1′,3′-DIOL DIKETAL (A) Following the procedure of Preparation 1(A), pregnane-3,11,20-trione-3,20-propane-1′,3′-diol diketal is prepared from pregnane-3,11,20-trione using propane-1,3-diol instead of ethylene glycol.

(B) In the manner of Preparation 1(B), 11β-hydroxypregnane-3,20-dione-3,20-propane-1′,3′-diol diketal is prepared using pregnane-3,11,20-trione-3,20-propane-1′,3′-diol diketal from Preparation 3(A) instead of pregnane-3,11,20-trione-3,20-ethylene glycol diketal.

By following the procedure set forth in Preparations 1(A) through 3(A), the following compounds are prepared from pregnane-3,11,20-trione, utilizing the appropriate alkane-1,2-diol or alkane-1,3-diol: pregnane-3,11,20-trione-3,20-butylene glycol diketal, pregnane-3,11,20-trione-3,20-amylene glycol diketal, pregnane-3,11,20-trione-3,20-hexylene glycol diketal, pregnane-3,11,20-trione-3,20-heptylene glycol diketal, pregnane-3,11,20-trione-3,20-octylene glycol diketal, the corresponding alkane-1,3-diketals such as, for example, pregnane-3,11,20-trione-3,20-butane-1′,3′-diol diketal, pregnane-3,11,20-trione-3,20-pentane-1′,3′-diol diketal, and others.

In the manner of Preparations 1(B) through 3(B), starting with the appropriate alkane-1,2-diol or alkane-1,3-diol derivative of pregnane-3,11,20-trione, the following compounds are prepared: 11β-hydroxypregnane-3,20-dione-3,20-butylene glycol diketal, 11β-hydroxypregnane-3,20-dione-3,20-amylene glycol diketal, 11β-hydroypregnane-3,20-dione-3,20-hexylene glycol diketal, 11β-hydroxypregnane-3,20-dione-3,20-heptylene glycol diketal, 11β-hydroxypregnane-3,20-dione-3,20-octylene glycol diketal, the corresponding alkane-1,3-diols such as, for example, 11β-hydroxypregnane-3,20-dione-3,20-butane-1′,3′-diol diketal, 11β-hydroxypregnane-3,20-dione-3,20-pentane-1′,3′-diol diketal, and others.

*Example 1.—11β-hydroxypregnane-3,20-dione*

To a solution of 300 milligrams (7.9 millimoles) of lithium aluminum hydride in thirty milliliters of ether was added 300 milligrams (0.71 millimole) of pregnane-3,11,20-trione-3,20-ethylene glycol diketal in ten milliliters of benzene and the resulting admixture stirred for one hour at room temperature and subsequently refluxed for one additional hour, according to the procedure of Preparation 1(B). The resulting reaction mixture was hydrolyzed with dilute hydrochloric acid, the resulting acidic solution stirred for sixteen hours at room temperature and the organic portion washed, dried over anhydrous sodium sulfate and concentrated. Crystallization from propanol-2 produced 120 milligrams, a yield of fifty-one per cent of theoretical, based on the starting pregnane-3,11,20-trione-3,20-ethylene glycol diketal, of 11β-hydroxypregnane-3,20-dione having a melting point of 169–172 degrees centigrade. Repeated recrystallization from a solvent mixture of ethyl acetate and normal hexane hydrocarbons (Skelly Solve B) yielded pure 11β-hydroxypregnane-3,20-dione, having a melting point of 172–174 degrees centigrade.

*Example 2.—11β-hydroxypregnane-3,20-dione*

To a solution of 238 milligrams of 11β-hydroxypregnane-3,20-dione-3,20-ethylene glycol diketal from Preparation 1(B), in thirty milliliters of methanol, was added two drops of concentrated hydrochloric acid in two milliliters of water and the resulting acidic mixture warmed to about fifty degrees centigrade and then stirred for about six hours at room temperature. The methanol was evaporated under a nitrogen atmosphere and the resulting residue crystallized from a small amount of methanol. Further recrystallization from methanol gave substantially pure 11β-hydroxypregnane-3,20-dione, melting at 172–174 degrees centigrade.

*Example 3.—11β-hydroxypregnane-3,20-dione*

In the manner of Example 2, 11β-hydroxypregnane-3,20-dione was obtained by hydrolysis of 11β-hydroxypregnane-3,20-dione-3,20-propylene glycol diketal from Preparation 2(B), utilizing a mole ratio of sulfuric acid to starting ketal substantially in excess of two to one, in the presence of water and methanol. The resulting mixture was warmed to the boiling point and permitted to stand for four hours whereafter the solvent was evaporated and the resulting residue recrystallized from ethyl acetate-normal hexane hydrocarbon mixture, yielding 11β-hydroxypregnane-3,20-dione in almost quantitative yield based upon the starting 11β-hydroxypregnane-3,20-dione-3,20-propylene glycol diketal. The infra-red spectrum confirmed the theoretical structure.

*Example 4.—11β-hydroxypregnane-3,20-dione*

Following the procedure of Example 1, 11β-hydroxypregnane-3,20-dione-3,20-propane-1′,3′-diol diketal from Preparation 3(B) is hydrolyzed with dilute hydrochloric acid at about room temperature according to the procedure of Example 1. Recrystallization from ethyl acetate-normal hexane hydrocarbon mixture (Skelly Solve B) gives substantially pure 11β-hydroxypregnane-3,20-dione in good yield.

*Example 5.—11β-hydroxypregnane-3,20-dione*

Following the procedure of Example 1, 11β-hydroxypregnane-3,20-dione-3,20-octylene glycol diketal is hydrolyzed with dilute hydrochloric acid to produce 11β-hydroxypregnane-3,20-dione.

Following the procedure of Examples 1 through 5, 11β-hydroxypregnane-3,20-dione can also be prepared from the following starting steroid diketal compounds: 11β - hydroxypregnane - 3,20 - dione - 3,20 - butylene glycol diketal, 11β-hydroxypregnane-3,20-amylene glycol diketal, 11β-hydroxypregnane-3,20-dione-3,20-hexylene glycol diketal, 11β-hydroxypregnane-3,20-dione-3,20-heptylene glycol diketal, the corresponding alkane-1,3-diol diketals such as, for example, 11β-hydroxypregnane-3,20-dione-3,20-propane-1′,3′-diol diketal, 11β-hydroxypregnane-3,20-dione-3,20-butane-1′,3′-diol diketal, 11β-hydroxypregnane - 3,20 - dione - 3,20 - (4 - methyl) pentane-1′,3′-diol diketal and others.

It is to be understood that the invention is not to be limited to the exact details of operation or compounds shown or described, as obvious modifications and equivalents will be apparent to one skilled in the art, and the invention is therefore to be limited only by the scope of the appended claims.

We claim:

1. A process which includes: mixing a hydrolyzing agent and an 11β-hydroxypregnane-3,20-dione-3,20-diketal, wherein the ketal group is the residue of a compound selected from the group consisting of alkane-1,2-diols and alkane-1,3-diols containing from two to eight carbon atoms inclusive, at a temperature between about zero degrees centigrade and the boiling point of the reaction mixture, to produce 11β-hydroxypregnane-3,20-dione.

2. A process which includes: mixing a hydrolyzing agent in excess of the amount theoretically required, and an 11β-hydroxypregnane-3,20-dione-3,20-diketal, wherein the ketal group is the residue of a compound selected from the group consisting of alkane-1,2-diols and alkane-1,3-diols containing from two to eight carbon atoms, inclusive, in an organic solvent which is non-reactive under the conditions of reaction, at a temperature between about zero degrees centigrade and the boiling point of the reaction mixture, and separating the thus-produced 11β-hydroxypregnane-3,20-dione from the reaction product.

3. A process which includes: mixing a dilute mineral acid in excess of the amount theoretically required, and an 11β-hydroxypregnane-3,20-dione-3,20-diketal, wherein the ketal group is the residue of a compound selected from the group consisting of alkane-1,2-diols and alkane-1,3-diols containing from two to eight carbon atoms, inclusive, in an organic solvent which is non-reactive under the conditions of reaction, at a temperature between about zero degrees centigrade and the boiling point of the reaction mixture, and separating the thus-produced 11β-hydroxypregnane-3,20-dione from the reaction product.

4. A process which includes: mixing a dilute mineral acid in excess of the amount theoretically required, and 11β-hydroxypregnane-3,20-dione-3,20-ethylene glycol diketal in an organic solvent which is non-reactive under the conditions of reaction at about room temperature, and separating the thus-produced 11β-hydroxypregnane-3,20-dione from the reaction product.

5. A process which includes: mixing a dilute mineral acid in excess of the amount theoretically required, and 11β - hydroxypregnane - 3,20 - dione - 3,20 - propylene glycol diketal in an organic solvent which is non-reactive under the conditions of reaction at about room temperature, and separating the thus-produced 11β-hydroxypregnane-3,20-dione from the reaction product.

6. A process which includes: mixing a dilute mineral acid in excess of the amount theoretically required, and 11β - hydroxypregnane - 3,20 - dione - 3,20 - propane-1′,3′-diol diketal in an organic solvent which is non-reactive under the conditions of reaction at about room temperature, and separating the thus-produced 11β-hydroxypregnane-3,20-dione from the reaction product.

7. A process which includes: mixing dilute hydrochloric acid in excess of the amount theoretically necessary and 11β-hydroxypregnane-3,20-dione-3,20-ethylene glycol diketal in benzene at about room temperature, and separating the thus-produced 11β-hydroxypregnane-3,20-dione from the reaction product.

8. A process for the production of 11β-hydroxypregnane-3,20-dione which includes the steps of reacting a pregnane-3,11,20-trione-3,20-alkanediol diketal wherein the ketal radical is the residue of a compound selected from the group consisting of alkane-1,2-diols and alkane-1,3-diols with a reducing agent to produce an 11β-hydroxypregnane-3,20-dione-3,20-alkanediol diketal and reacting the 11β-hydroxypregnane-3,20-dione-3,20-alkanediol diketal thus-produced with an acid hydrolyzing agent to produce 11β-hydroxypregnane-3,20-dione.

9. A process for the production of 11β-hydroxypregnane-3,20-dione which includes the steps of reacting pregnane-3,11,20-trione-3,20-ethylene glycol diketal with lithium aluminum hydride in excess of the amount theoretically required in an organic solvent which is non-reactive under the conditions of reaction to produce 11β-hydroxypregnane-3,20-dione-3,20-ethylene glycol diketal, reacting the 11β-hydroxypregnane-3,20-dione-3,20-ethylene glycol diketal thus-produced with a dilute mineral acid in excess of the amount theoretically required, to produce 11β-hydroxypregnane-3,20-dione.

10. A process for the production of 11β-hydroxypregnane-3,20-dione which includes the steps of reacting pregnane-3,11,20-trione with a ketalizing agent selected from the group consisting of alkane-1,2-diols and alkane-1,3-diols containing from two to eight carbon atoms, inclusive, in the presence of an acid catalyst to produce a pregnane-3,11,20-trione-3,20-alkanediol diketal, reacting the thus-produced pregnane - 3,11,20 - trione - 3,20- alkanediol diketal with a reducing agent to produce an 11β-hydroxypregnane-3,20-dione-3,20-alkanediol diketal and reacting the thus-produced 11β-hydroxypregnane-3,20-dione-3,20-alkanediol diketal with an acid hydrolyzing agent to produce 11β-hydroxypregnane-3,20-dione.

11. A process for the production of 11β-hydroxypregnane-3,20-dione which includes the steps of reacting pregnane-3,11,20-trione with ethylene glycol in the presence of para-toluenesulfonic acid to produce pregnane-3,11,20-trione-3,20-trione-3,20-ethylene glycol diketal, reacting the thus-produced pregnane-3,11,20-trione-3,20-ethylene glycol diketal with lithium aluminum hydride in excess of the amount theoretically required, in an organic solvent which is non-reactive under the conditions of reactions to produce 11β-hydroxypregnane-3,20-dione-3,20-ethylene glycol diketal and reacting the 11β-hydroxypregnane-3,20-dione-3,20-ethylene glycol diketal thus-produced with a dilute mineral acid to produce 11β-hydroxypregnane-3,20-dione.

References Cited in the file of this patent

UNITED STATES PATENTS

| | | |
|---|---|---|
| 2,356,154 | Fernholz | Aug. 22, 1944 |
| 2,622,081 | Bernstein | Dec. 16, 1952 |